United States Patent
Hirata et al.

(10) Patent No.: US 11,339,462 B2
(45) Date of Patent: May 24, 2022

(54) AUSTENITIC STAINLESS STEEL WELD METAL AND WELDED STRUCTURE

(71) Applicant: NIPPON STEEL CORPORATION, Tokyo (JP)

(72) Inventors: Hiroyuki Hirata, Tokyo (JP); Katsuki Tanaka, Tokyo (JP); Kana Jotoku, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/753,200

(22) PCT Filed: Oct. 3, 2018

(86) PCT No.: PCT/JP2018/037097
§ 371 (c)(1),
(2) Date: Apr. 2, 2020

(87) PCT Pub. No.: WO2019/070000
PCT Pub. Date: Apr. 11, 2019

(65) Prior Publication Data
US 2020/0283878 A1    Sep. 10, 2020

(30) Foreign Application Priority Data
Oct. 3, 2017   (JP) .............................. JP2017-193688

(51) Int. Cl.
*B23K 35/02*    (2006.01)
*C22C 38/00*    (2006.01)
(Continued)

(52) U.S. Cl.
CPC .......... *C22C 38/54* (2013.01); *B23K 35/0255* (2013.01); *C21D 9/50* (2013.01);
(Continued)

(58) Field of Classification Search
CPC . B23K 35/0255; C22C 38/001; C22C 38/002; C22C 38/02; C22C 38/04;
(Continued)

(56) References Cited

U.S. PATENT DOCUMENTS

2009/0142218 A1    6/2009  Bergstrom et al.
2010/0034689 A1*   2/2010  Hirata ................... C22C 38/001
                                                         420/41
2018/0216215 A1    8/2018  Hirata et al.

FOREIGN PATENT DOCUMENTS

JP          57-2869 A     1/1982
JP          61-23749 A    2/1986
(Continued)

OTHER PUBLICATIONS

Nishiyama et al., JP 2015-137420 A machine translation, Jul. 30, 2015, entire translation (Year: 2015).*

(Continued)

*Primary Examiner* — Humera N. Sheikh
*Assistant Examiner* — Katherine A Christy
(74) *Attorney, Agent, or Firm* — Birch, Stewart, Kolasch & Birch, LLP (57) ABSTRACT

A austenitic stainless steel weld metal which has a chemical composition consisting of, by mass %, C: 0.01 to 0.10%, Si: 0.20 to 0.70%, Mn: 0.8 to 2.5%, P: 0.035% or less, S: 0.0030% or less, Cu: 0.01 to 0.60%, Co: 0.01 to 1.00%, Ni: 8.0 to 12.0%, Cr: 14.5 to 17.5%, Mo: 1.0 to 2.2%, N: 0.02 to 0.10%, Al: 0.030% or less, O: 0.020% or less, Sn: 0 to 0.01%, Sb: 0 to 0.01%, As: 0 to 0.01%, Bi: 0 to 0.01%, V: 0 to 0.10%, Nb: 0 to 0.10%, Ti: 0 to 0.10%, W: 0 to 0.50%, B: 0 to 0.005%, Ca: 0 to 0.010%, Mg: 0 to 0.010% and REM: 0 to 0.10%, with the balance being Fe and impurities, and satisfying [17.5≤Cr+Mo+1.5×Si≤19.5] and [11.0≤Ni+30×(C+N)+0.5×(Mn+Cu+Co)≤17.0].

5 Claims, 1 Drawing Sheet

(51) Int. Cl.
   *C22C 38/02* (2006.01)
   *C22C 38/04* (2006.01)
   *C22C 38/10* (2006.01)
   *C22C 38/12* (2006.01)
   *C22C 38/20* (2006.01)
   *C22C 38/54* (2006.01)
   *C21D 9/50* (2006.01)
   *C22C 38/06* (2006.01)
   *C22C 38/14* (2006.01)
   *C22C 38/60* (2006.01)

(52) U.S. Cl.
   CPC .......... *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/20* (2013.01); *C22C 38/60* (2013.01); *C21D 2211/001* (2013.01)

(58) Field of Classification Search
   CPC ......... C22C 38/10; C22C 38/12; C22C 38/20; C21D 2211/001
   USPC .......................................................... 420/49
   See application file for complete search history.

(56) References Cited

FOREIGN PATENT DOCUMENTS

| JP | 9-300096 A | | 11/1997 |
|---|---|---|---|
| JP | 2000-102891 A | | 4/2000 |
| JP | 2015137420 A | * | 7/2015 |
| JP | 2017-95767 A | | 6/2017 |
| WO | WO 2009/044796 A1 | | 4/2009 |
| WO | WO 2017/002523 A1 | | 1/2017 |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/037097, dated Apr. 16, 2020.
International Search Report (Form PCT/ISA/210) for International Application No. PCT/JP2018/037097, dated Dec. 25, 2018, with English translation.

* cited by examiner

AUSTENITIC STAINLESS STEEL WELD METAL AND WELDED STRUCTURE

TECHNICAL FIELD

The present invention relates to an austenitic stainless steel weld metal and to a welded structure having the austenitic stainless steel weld metal.

BACKGROUND ART

TP316H that is defined by ASME (American Society of Mechanical Engineers) SA213 and SA213M contains Mo and is excellent in corrosion resistance at high temperatures, and is therefore widely used as a material for heat-transfer pipes and heat exchangers in thermal power generation plants and petrochemical plants.

For example, Patent Document 1 discloses a proposition of an austenitic stainless steel, which, similarly to TP316H, contains Mo, and also contains Ce to enhance high-temperature corrosion resistance. Further, Patent Document 2 discloses a proposition of an austenitic stainless steel and the like, which also contains Nb, Ta and Ti to enhance high temperature strength.

In this connection, these austenitic stainless steels are generally used as welded structures that have weld metal. Although weld metal obtained by using a commercially available welding material for Ni-based heat resistant alloys (for example, JIS Z 3334 (2011) SNi6082) provides consistently adequate performance from the viewpoint of creep strength and toughness, the weld metal is expensive because it contains a large amount of Ni. On the other hand, although weld metal obtained by using a commercially available welding material for Mo-containing stainless steel (JIS Z 3321 (2010) YS16-8-2) is inexpensive, there is the problem that the weld metal becomes brittle during use at high temperatures and forms a hard a phase, and the creep strength decreases significantly.

Therefore, Patent Document 3 discloses a proposition of an inert-gas-shielded welding wire for Mo-containing austenitic stainless steel, which, by defining the content of C and N and also actively utilizing Nb and Cu, increases creep strength, and also reduces the content of P and B to increase weld crack resistance during welding. Further, Patent Document 4 discloses a proposition of a welding material for Mo-containing austenitic stainless steel that achieves both creep strength and reheat cracking resistance during heat treatment, in which the balance between Cr equivalents and Ni equivalents is adjusted and which also utilizes Nb and Cu.

LIST OF PRIOR ART DOCUMENTS

Patent Documents

Patent Document 1: JP57-2869A
Patent Document 2: JP61-23749A
Patent Document 3: JP9-300096A
Patent Document 4: JP2000-102891A

SUMMARY OF INVENTION

Technical Problem

However, with respect to weld metal obtained by using the welding material described in Patent Document 1 or 2, it has been found that, for example, in the case of a welded joint shape under strong constraints, such as a case where the weld metal is used for a thick-walled welded structure such as an actual large scale plant, weld cracks sometimes occur in the weld metal during welding. Therefore, there is a need to suppress the occurrence of weld cracks and realize excellent weld crack resistance.

On the other hand, even in a case where weld cracks are suppressed, in some cases the creep strength deteriorates when the welded structure is exposed to a high temperature environment (for example, an environment at 650° C.), and therefore there is a need to realize stable creep strength in a high temperature environment in addition to weld crack resistance.

An objective of the present invention is to provide an austenitic stainless steel weld metal which is excellent in weld crack resistance and has high creep strength and which is weld metal that constitutes a structure used in equipment to be used at high temperatures, and also provide a welded structure that includes the austenitic stainless steel weld metal.

Solution to Problem

The present invention has been made to solve the problems described above, and the gist of the present invention is the following austenitic stainless steel weld metal and the welded structure.

(1) An austenitic stainless steel weld metal having a chemical composition consisting of, by mass %:

C: 0.01 to 0.10%,
Si: 0.20 to 0.70%,
Mn: 0.8 to 2.5%,
P: 0.035% or less,
S: 0.0030% or less,
Cu: 0.01 to 0.60%,
Co: 0.01 to 1.00%,
Ni: 8.0 to 12.0%,
Cr: 14.5 to 17.5%,
Mo: 1.0 to 2.2%,
N: 0.02 to 0.10%,
Al: 0.030% or less,
O: 0.020% or less,
Sn: 0 to 0.01%,
Sb: 0 to 0.01%,
As: 0 to 0.01%,
Bi: 0 to 0.01%,
V: 0 to 0.10%,
Nb: 0 to 0.10%,
Ti: 0 to 0.10%,
W: 0 to 0.50%,
B: 0 to 0.005%,
Ca: 0 to 0.010%,
Mg: 0 to 0.010%,
REM: 0 to 0.10%, and
the balance: Fe and impurities,
and satisfying formula (i) and formula (ii) below:

$$17.5 \leq Cr+Mo+1.5 \times Si \leq 19.5 \quad \text{(i)}$$

$$11.0 \leq Ni+30 \times (C+N)+0.5 \times (Mn+Cu+Co) \leq 17.0 \quad \text{(ii)}$$

where, each symbol of an element in the above formulas represents a content (mass %) of the corresponding element contained in the steel.

(2) The austenitic stainless steel weld metal according to (1) above, wherein:

the chemical composition contains, by mass %, one or more types of element selected from Sn, Sb, As and Bi in a total amount within a range of more than 0% to not more than 0.01%.

(3) The austenitic stainless steel weld metal according to (1) or (2) above, wherein the chemical composition contains, by mass %, one or more types of element selected from:

V: 0.01 to 0.10%,
Nb: 0.01 to 0.10%,
Ti: 0.01 to 0.10%,
W: 0.01 to 0.50%,
B: 0.0002 to 0.005%,
Ca: 0.0005 to 0.010%,
Mg: 0.0005 to 0.010%, and
REM: 0.0005 to 0.10%.

(4) A welded structure having the austenitic stainless steel weld metal according to any one of (1) to (3) above.

Advantageous Effects of Invention

According to the present invention, an austenitic stainless steel weld metal which is excellent in weld crack resistance and has high creep strength and which is weld metal that constitutes a structure used in equipment to be used at high temperatures, and also a welded structure that includes the austenitic stainless steel weld metal can be obtained.

DESCRIPTION OF EMBODIMENTS

The present inventors conducted detailed studies for achieving both excellent weld crack resistance and stable creep strength as a structure. As a result, the present inventors obtained the following findings.

As the result of conducting studies regarding cracking that occurs in an austenitic stainless steel weld metal containing Mo, the present inventors discovered that: (a) cracking occurs at intersection of columnar crystals and at grain boundaries that are slightly away from fusion boundaries of subsequent weld pass in multi-layered weld metals; (b) the former is liable to occur in component systems in which the stability of the austenite phase is high; and (c) the latter is liable to occur when the content of S is high.

Therefore, it is considered that the former is so-called "solidification cracking", and is cracking that occurs when, as the result of the stability of the austenite phase increasing, the solidification morphology of the weld metal changes, P and S and the like become more liable to segregate during solidification, the melting point of the residual liquid phase decreases, a liquid film is present for an extended period at intersection of columnar crystals of columnar crystals, and those portions open due to thermal stress. It is also considered that the latter is so-called "ductility-dip cracking", and is cracking that occurs when S that underwent grain-boundary segregation in a thermal cycle of a subsequent weld pass during welding causes the sticking force at the grain boundaries to decrease, and thermal stress exceeds the sticking force, causing the relevant portions to open.

Further, as the result of intensive studies, the present inventors ascertained that, in an austenitic stainless steel weld metal having a composition that is the object of the present invention, in order to prevent cracking it is necessary that the value of $Cr+Mo+1.5\times Si$ is not less than 17.5 and the value of $Ni+30\times(C+N)+0.5\times(Mn+Cu+Co)$ is not more than 17.0, and also the content of S is limited to 0.0030% or less. In addition, the present inventors found that it is necessary to contain a prescribed amount or more of Cu and Co in order to sufficiently obtain an effect that reduces weld crack susceptibility.

In this connection, although the weld crack resistance of weld metal can be ensured by adopting the above measures, it was found that in a case where the value of $Cr+Mo+1.5\times Si$ is more than 19.5 or a case where the value of $Ni+30\times(C+N)+0.5\times(Mn+Cu+Co)$ is less than 11.0, on the contrary, the austenite phase becomes unstable and a σ phase forms during use at a high temperature and the creep strength decreases significantly.

Further, although on one hand S has an adverse effect on weld cracks, S increases the weld penetration depth when forming weld metal, and in particular has an effect of improving the weldability in fabrication during root pass welding. From the viewpoint of weld cracks, it was found that when the content of S is controlled to be 0.0030% or less, the weld penetration depth is not adequately obtained in some cases. Although, in order to solve this problem, it suffices to simply increase the weld heat input when forming the weld metal, increasing the heat input increases the susceptibility with respect to weld cracks.

Therefore, the present inventors also discovered that when it is desired to adequately obtain this effect, it is effective to contain one or more types of element selected from Sn, Sb, As and Bi in an amount within a predetermined range. It is considered that this is because, when forming weld metal, these elements influence the convection of the molten pool during welding and also evaporate from the molten pool surface to contribute to formation of a current path, and thereby promote melting in the depth direction.

The present invention was made based on the findings described above. The respective requirements of the present invention are described in detail hereunder.

(A) Chemical Composition

The reasons for limiting each element are as follows. Note that, the symbol "%" with respect to content in the following description means "mass percent".

C: 0.01 to 0.10%

C makes the austenite phase stable and also combines with Cr to form fine carbides, and improves the creep strength during use at high temperatures. However, if an excessive amount of C is contained, carbides will precipitate in large amounts, leading to embrittlement. Therefore, the content of C is set within the range of 0.01 to 0.10%. The content of C is preferably 0.02% or more, and more preferably is 0.03% or more. Further, the content of C is preferably not more than 0.09%, and more preferably is not more than 0.08%.

Si: 0.20 to 0.70%

Si is an element that has a deoxidizing action, and is also required to secure corrosion resistance and oxidation resistance at high temperatures. However, if an excessive amount of Si is contained, the stability of the austenite phase will decrease, which will result in a decrease in the creep strength. Therefore, the content of Si is set within the range of 0.20 to 0.70%. The content of Si is preferably 0.25% or more, and more preferably is 0.30% or more. Further, the content of Si is preferably not more than 0.60%, and more preferably is not more than 0.50%.

Mn: 0.8 to 2.5%

Similarly to Si, Mn is an element that has a deoxidizing action. Mn also makes the austenite phase stable and contributes to improvement of the creep strength. However, if an excessive amount of Mn is contained, it will result in a decrease in creep ductility. Therefore, the content of Mn is set within the range of 0.8 to 2.5%. The content of Mn is preferably 0.9% or more, and more preferably is 1.0% or more. Further, the content of Mn is preferably not more than 2.2%, and more preferably is not more than 2.0%.

P: 0.035% or Less

P is an element which is contained as an impurity, and segregates during solidification during welding and lowers the melting point of the residual liquid phase and increases the solidification cracking susceptibility. P also decreases the creep ductility. Therefore, an upper limit is set for the content of P, and is 0.035% or less. The content of P is preferably 0.032% or less, and more preferably is 0.030% or less. Note that, although it is preferable that the content of P is reduced as much as possible, that is, although the content may be 0%, extreme reduction of the content of P will lead to an increase in costs at the time of material production. Therefore, the content of P is preferably 0.0005% or more, and more preferably is 0.0008% or more.

S: 0.0030% or Less

Similarly to P, S is contained as an impurity, and segregates during solidification during welding and lowers the melting point of the residual liquid phase and increases the solidification cracking susceptibility. Further, by undergoing grain-boundary segregation in a heat cycle of a subsequent weld pass after solidification, S also increases the ductility-dip cracking susceptibility. Therefore, an upper limit is set for the content of S, and is 0.0030% or less. The content of S is preferably less than 0.0025%, and more preferably is not more than 0.0020%. Note that although it is preferable that the content of S is reduced as much as possible, that is, although the content may be 0%, extreme reduction of the content of S will lead to an increase in costs at the time of material production. Therefore, the content of S is preferably 0.0001% or more, and more preferably is 0.0002% or more.

Cu: 0.01 to 0.60%

Cu enhances the stability of the austenite phase and contributes to improving the creep strength. Further, the influence of imparting segregation energy of P and S and the like is small in comparison to Ni and Mn, and thus an effect of reducing segregation during solidification and decreasing weld crack susceptibility can be expected. However, if an excessive amount of Cu is contained, it will result in a decrease in ductility. Therefore, the content of Cu is set within the range of 0.01 to 0.60%. The content of Cu is preferably 0.02% or more, and more preferably is 0.03% or more. Further, the content of Cu is preferably not more than 0.55%, and more preferably is not more than 0.50%.

Co: 0.01 to 1.00%

Co is an element that, similarly to Cu, enhances the stability of the austenite phase and contributes to improving the creep strength. Further, the influence of imparting segregation energy of P and S and the like is small in comparison to Ni and Mn, and thus an effect of reducing segregation during solidification and decreasing weld crack susceptibility can be expected. However, because Co is an expensive element, if an excessive amount of Co is contained, it will result in an increase in the production cost of the material. Therefore, the content of Co is set within the range of 0.01 to 1.00%. The content of Co is preferably 0.02% or more, and more preferably is 0.03% or more. Further, the content of Co is preferably not more than 0.90%, and more preferably is not more than 0.80%.

Ni: 8.0 to 12.0%

Ni is an essential element for ensuring the stability of the austenite phase during use for an extended period. However, Ni is an expensive element, and containing a large amount of Ni leads to an increase in the production cost of the material. Therefore, the content of Ni is set within the range of 8.0 to 12.0%. The content of Ni is preferably 8.2% or more, and more preferably is 8.5% or more. Further, the content of Ni is preferably not more than 11.8%, and more preferably is not more than 11.5%.

Cr: 14.5 to 17.5%

Cr is an essential element for ensuring oxidation resistance and corrosion resistance at a high temperature. Further, Cr also forms fine carbides and contributes to ensuring creep strength. However, containing a large amount of Cr will reduce the stability of the austenite phase, and on the contrary, will be detrimental to the creep strength. Therefore, the content of Cr is set within the range of 14.5 to 17.5%. The content of Cr is preferably 15.0% or more, and more preferably is 15.5% or more. Further, the content of Cr is preferably not more than 17.2%, and more preferably is not more than 17.0%.

Mo: 1.0 to 2.2%

Mo is an element which dissolves in the matrix and contributes to the enhancement of creep strength and tensile strength at high temperatures. In addition, Mo is effective for improving corrosion resistance. However, if the content of Mo is too large, it will decrease the stability of the austenite phase and will be detrimental to creep strength. In addition, because Mo is an expensive element, if the content of Mo is excessive, it will result in an increase in the production cost of the material. Therefore, the content of Mo is set within the range of 1.0 to 2.2%. The content of Mo is preferably 1.1% or more, and more preferably is 1.2% or more. Further, the content of Mo is preferably not more than 2.1%, and more preferably is not more than 2.0%.

N: 0.02 to 0.10%

N makes the austenite phase stable, and also dissolves or precipitates as nitrides and contributes to improving high temperature strength. However, if an excessive amount of N is contained, it will lead to a decrease in ductility. Therefore, the content of N is set within the range of 0.02 to 0.10%. The content of N is preferably 0.03% or more, and more preferably is 0.04% or more. Further, the content of N is preferably not more than 0.09%, and more preferably is not more than 0.08%.

Al: 0.030% or Less

If a large amount of Al is contained, the cleanliness will deteriorate and the ductility will decrease. Therefore, the content of Al is set to 0.030% or less. The content of Al is preferably 0.025% or less, and more preferably is 0.020% or less. Note that, although it is not particularly necessary to set a lower limit for the content of Al, that is, although the content may be 0%, an extreme reduction will lead to an increase in the production cost of the material. Therefore, the content of Al is preferably 0.0005% or more, and more preferably is 0.001% or more.

O: 0.020% or Less

O (oxygen) is contained as an impurity. If the content of O is excessive, it will result in a deterioration in toughness and ductility. Therefore, the content of O is 0.020% or less. The content of O is preferably 0.018% or less, and more preferably is 0.015% or less. Note that, although it is not particularly necessary to set a lower limit for the content of O, that is, although the content may be 0%, an extreme reduction will lead to an increase in the production cost of the material. Therefore, the content of O is preferably 0.0005% or more, and more preferably is 0.0008% or more.

As described above, Cr, Mo and Si exert an influence on the stability of the austenite phase. Therefore, it is necessary for the content of each of these elements to not only fall within the ranges described above, but also to satisfy formula (i) below. If the middle value in formula (i) is more than 19.5, the stability of the austenite phase will decrease, and during use at a high temperature a brittle σ phase will be formed and the creep strength will decrease. On the other hand, if the middle value in formula (i) is less than 17.5, although the stability of the austenite phase will increase, hot cracking is liable to occur during welding. The left-hand value in formula (i) is preferably 17.8, and more preferably is 18.0. On the other hand, the right-hand value in formula (i) is preferably 19.2, and more preferably is 19.0:

$$17.5 \leq Cr+Mo+1.5 \times Si \leq 19.5 \qquad (i)$$

where, each symbol of an element in the above formula represents a content of (mass %) of the corresponding element that is contained in the steel.

Further, Ni, C, N, Mn, Cu and Co exert an influence on the stability of the austenite phase. Therefore, it is necessary for the content of each of these elements to not only fall within the ranges described above, but also to satisfy formula (ii) below. If the middle value in formula (ii) is less than 11.0, the stability of the austenite phase will not be sufficient, and during use at a high temperature a brittle σ phase will be formed and the creep strength will decrease. On the other hand, if the middle value in formula (ii) is more than 17.0, the austenite phase will become excessively stable, and hot cracking is liable to occur during welding. The left-hand value in formula (ii) is preferably 11.2, and more preferably 11.5. On the other hand, the right-hand value in formula (ii) is preferably 16.8, and more preferably 16.5:

$$11.0 \leq Ni+30 \times (C+N)+0.5 \times (Mn+Cu+Co) \leq 17.0 \qquad (ii)$$

where, each symbol of an element in the above formulas represents a content (mass %) of the corresponding element that is contained in the steel.

In the chemical composition of the weld metal of the present invention, in addition to the elements described above, one or more types of element selected from Sn, Sb, As and Bi may also be contained within the ranges described below. The reason is described hereunder.

Sn: 0 to 0.01%
Sb: 0 to 0.01%
As: 0 to 0.01%
Bi: 0 to 0.01%

Sn, Sb, As and Bi exert an influence on the formation of the weld metal, that is, convection of the molten pool during welding, and promote heat transport in the vertical direction of the molten pool, and have an effect of increasing the weld penetration depth by evaporating from the molten pool surface and forming a current path to increase the degree of concentration of the arc. Therefore, one or more types of element selected from these elements may be contained as necessary. However, if an excessive amount of these elements is contained, the weld crack susceptibility will increase, and therefore the content of each of these elements is 0.01% or less. The content of each of these elements is preferably 0.008% or less, and more preferably 0.006% or less.

When it is desired to obtain the aforementioned effect, the content of one or more types of element selected from the aforementioned elements is preferably more than 0%, more preferably is 0.0005% or more, further preferably is 0.0008% or more, and still more preferably is 0.001% or more. Further, in the case of containing a combination of two or more types of element selected from the aforementioned elements, the total content of the elements is preferably 0.01% or less, more preferably is 0.008% or less, and further preferably is 0.006% or less.

In the chemical composition of the weld metal of the present invention, in addition to the elements described above, one or more types of element selected from V, Nb, Ti, W, B, Ca, Mg and REM may also be contained within the ranges described below. The reasons for limiting each element are described hereunder.

V: 0 to 0.10%

V combines with C and/or N to form fine carbides, nitrides or carbo-nitrides and contributes to the creep strength, and therefore may be contained as necessary. However, if contained in excess, a large amount of carbo-nitrides will precipitate and result in a reduction in the creep ductility. Therefore, the content of V is set to 0.10% or less. The content of V is preferably 0.09% or less, and more preferably is 0.08% or less. Note that, when it is desired to obtain the aforementioned effect, the content of V is preferably 0.01% or more, and more preferably is 0.02% or more.

Nb: 0 to 0.10%

Nb is an element that, similarly to V, combines with C and/or N and precipitates within grains as fine carbides, nitrides or carbo-nitrides and contributes to enhancing the creep strength and tensile strength at a high temperature, and therefore may be contained as necessary. However, if contained in excess, a large amount of carbo-nitrides will precipitate and result in a reduction in the creep ductility. Therefore, the content of Nb is set to 0.10% or less. The content of Nb is preferably 0.08% or less, and more preferably is 0.06% or less. Note that, when it is desired to obtain the aforementioned effect, the content of Nb is preferably 0.01% or more, and more preferably is 0.02% or more.

Ti: 0 to 0.10%

Ti is an element that, similarly to V and Nb, combines with C and/or N to form fine carbides, nitrides or carbo-nitrides and contributes to creep strength, and therefore may be contained as necessary. However, if contained in excess, a large amount of carbo-nitrides will precipitate and result in a reduction in the creep ductility. Therefore, the content of Ti is set to 0.10% or less. The content of Ti is preferably 0.08% or less, and more preferably is 0.06% or less. Note that, when it is desired to obtain the aforementioned effect, the content of Ti is preferably 0.01% or more, and more preferably 0.02% or more.

W: 0 to 0.50%

W is an element that, similarly to Mo, dissolves in the matrix and contributes to enhancement of creep strength and tensile strength at high temperatures, and therefore may be contained as necessary. However, if contained in excess, W will reduce the stability of the austenite phase and, on the contrary, will result in a decrease in the creep strength. Therefore, the content of W is set to 0.50% or less. The content of W is preferably 0.40% or less, and more preferably 0.30% or less. Note that, when it is desired to obtain the aforementioned effect, the content of W is preferably 0.01% or more, and more preferably 0.02% or more.

B: 0 to 0.005%

B causes grain boundary carbides to finely disperse to thereby enhance the creep strength, and also segregates at the grain boundaries to strengthen the grain boundaries and has a certain effect for reducing ductility-dip cracking susceptibility, and therefore may be contained as necessary. However, if contained in excess, conversely, B will increase solidification cracking susceptibility. Therefore, the content of B is set to 0.005% or less. The content of B is preferably 0.004% or less, and more preferably is 0.003% or less. Note that, when it is desired to obtain the aforementioned effect, the content of B is preferably 0.0002% or more, and more preferably 0.0005% or more.

Ca: 0 to 0.010%

Ca has an effect that improves hot deformability, and therefore may be contained as necessary. However, if contained in excess, Ca will combine with oxygen and cause the cleanliness to markedly decrease, and on the contrary will cause the deformability during hot processing to deteriorate. Therefore, the content of Ca is set to 0.010% or less. The content of Ca is preferably 0.008% or less, and more preferably is 0.005% or less. Note that, when it is desired to obtain the aforementioned effect, the content of Ca is preferably 0.0005% or more, and more preferably is 0.001% or more.

Mg: 0 to 0.010%

Mg is an element that, similarly to Ca, has an effect that improves hot deformability, and therefore may be contained as necessary. However, if contained in excess, Mg will combine with oxygen and cause the cleanliness to markedly decrease, and on the contrary will cause the deformability during hot processing to deteriorate. Therefore, the content of Mg is set to 0.010% or less. The content of Mg is preferably 0.008% or less, and more preferably 0.005% or less. Note that, when it is desired to obtain the aforementioned effect, the content of Mg is preferably 0.0005% or more, and more preferably 0.001% or more.

REM: 0 to 0.10%

Similarly to Ca and Mg, REM has an effect that improves hot deformability, and therefore may be contained as necessary. However, if contained in excess, REM will combine with oxygen and cause the cleanliness to markedly decrease, and on the contrary will cause the deformability during hot processing to deteriorate. Therefore, the content of REM is set to 0.10% or less. The content of REM is preferably 0.08% or less, and more preferably 0.06% or less. Note that, when it is desired to obtain the aforementioned effect, the content of REM is preferably 0.0005% or more, and more preferably 0.001% or more.

As used herein, the term "REM" refers to a total of 17 elements that are Sc, Y and the lanthanoids, and the aforementioned content of REM means the total content of these elements.

In the chemical composition of the weld metal of the present invention, the balance is Fe and impurities. As used herein, the term "impurities" refers to components which, during industrial production of the steel, are mixed in from raw material such as ore or scrap or due to various factors in the production process, and which are allowed within a range that does not adversely affect the present invention.

(B) Production Method

The austenitic stainless steel weld metal according to the present invention is produced by welding a base metal of austenitic stainless steel. Note that, the austenitic stainless steel weld metal may also be produced by using a welding material (filler material) when welding the base metal.

A welding method for obtaining the austenitic stainless steel weld metal according to the present invention includes, but not particularly limited to, TIG welding, MIG welding, shielded metal arc welding, submerged arc welding and laser welding.

Examples of methods for producing an austenitic stainless steel weld metal so as to satisfy the chemical composition described above include a method that controls by adjusting the chemical composition of the base metal of austenitic stainless steel that is used, and a method that, in a case where a welding material (filler material) is also used, controls by also adjusting the chemical composition of the welding material in addition to the chemical composition of the base metal of austenitic stainless steel.

For example, the weld metal to be obtained may be produced so as to satisfy the aforementioned chemical composition by using only material which satisfies the aforementioned chemical composition as the base metal of austenitic stainless steel and the welding material (filler material) that are used. Further, the weld metal to be obtained may be produced so as to satisfy the aforementioned chemical composition by adjusting the balance between the compositions of the base metal of austenitic stainless steel and the welding material (filler material) while using a material that does not satisfy the aforementioned chemical composition for at least one of the base metal of austenitic stainless steel and the welding material (filler material).

Note that a preferable composition of the austenitic stainless steel base metal is not particularly limited. For example, the chemical composition of the base metal preferably consists of, by mass %, C: 0.04 to 0.12%, Si: 0.25 to 0.55%, Mn: 0.7 to 2.0%, P: 0.035% or less, S: 0.0015% or less, Cu: 0.02 to 0.80%, Co: 0.02 to 0.80%, Ni: 10.0 to 14.0%, Cr: 15.5 to 17.5%, Mo: 1.5 to 2.5%, N: 0.01 to 0.10%, Al: 0.030% or less, O: 0.020% or less, Sn: 0 to 0.01%, Sb: 0 to 0.01%, As: 0 to 0.01%, Bi: 0 to 0.01%, V: 0 to 0.10%, Nb: 0 to 0.10%, Ti: 0 to 0.10%, W: 0 to 0.50%, B: 0 to 0.005%, Ca: 0 to 0.010%, Mg: 0 to 0.010%, and REM: 0 to 0.10%, with the balance being Fe and impurities.

The chemical composition of the base metal may contain one or more types of element selected from Sn, Sb, As and Bi in a total amount within a range of, by mass %, more than 0% to not more than 0.01%. In addition, the chemical composition of the base metal may contain one or more types of element selected from, by mass %, V: 0.01 to 0.10%, Nb: 0.01 to 0.10%, Ti: 0.01 to 0.10%, W: 0.01 to 0.50%, B: 0.0002 to 0.005%, Ca: 0.0005 to 0.010%, Mg: 0.0005 to 0.010% and REM: 0.0005 to 0.10%.

Further, although a method for producing the aforementioned base metal of austenitic stainless steel and welding material (filler material) is not particularly limited, the base metal of austenitic stainless steel and the welding material (filler material) can be produced by subjecting a steel with an adjusted chemical composition to hot forging, hot rolling, heat treatment and machining in that order according to a normal method.

(C) Welded Structure

The welded structure according to the present invention is a structure that has the austenitic stainless steel weld metal mentioned above. For example, the welded structure is composed of weld metal and base metal. The base metal is made of metal, and preferably is a steel material, more preferably is stainless steel, and further preferably is austenitic stainless steel. Note that the specific shape of the welded structure and a specific manner of welding (welding position) for obtaining the welded structure are not particularly limited.

Hereunder, the present invention is described specifically by way of examples, although the present invention is not limited to these examples.

Example 1

Plates (base metals) having a thickness of 15 mm, a width of 50 mm, and a length of 100 mm and plates having a thickness of 4 mm, a width of 200 mm, and a length of 500 mm were prepared from ingots that were cast by melting steels having the chemical compositions shown in Table 1, by performing hot forging, hot rolling, heat treatment and machining. In addition, the plates having a thickness of 4 mm were used to prepare 2-mm square cut fillers having a length of 500 mm by machining. Various performance evaluation tests that are described below were conducted using these plates.

TABLE 1

| Steel | \multicolumn{13}{c}{Chemical Composition (mass %; balance: Fe and impurities)} |
|---|---|---|---|---|---|---|---|---|---|---|---|---|---|
| | C | Si | Mn | P | S | Cu | Co | Ni | Cr | Mo | N | Al | O |
| A | 0.07 | 0.28 | 1.55 | 0.018 | 0.0019 | 0.03 | 0.01 | 11.5 | 16.0 | 1.6 | 0.07 | 0.008 | 0.007 |
| B | 0.08 | 0.49 | 1.98 | 0.026 | 0.0024 | 0.01 | 0.02 | 11.8 | 16.2 | 2.1 | 0.06 | 0.010 | 0.005 |
| C | 0.03 | 0.25 | 0.90 | 0.030 | 0.0009 | 0.18 | 0.03 | 8.2 | 15.1 | 2 0 | 0.05 | 0.006 | 0.008 |
| D | 0.02 | 0.35 | 0.81 | 0.021 | 0.0002 | 0.48 | 0.80 | 9.8 | 15.9 | 1.8 | 0.03 | 0.012 | 0.004 |
| E | 0.05 | 0.20 | 1.52 | 0.032 | 0.0002 | 0.27 | 0.46 | 11.5 | 17.2 | 1.5 | 0.09 | 0.003 | 0.012 |
| F | 0.09 | 0.58 | 2.16 | 0.024 | 0.0003 | 0.02 | 0.24 | 9.2 | 16.1 | 2.2 | 0.08 | 0.004 | 0.010 |
| G | 0.06 | 0.33 | 1.48 | 0.029 | <u>0.0033</u> | 0.15 | 0.20 | 11.3 | 16.3 | 1.7 | 0.05 | 0.005 | 0.006 |
| H | 0.03 | 0.40 | 0.90 | 0.024 | 0.0013 | 0.10 | 0.02 | 8.8 | 15.4 | 1.9 | 0.02 | 0.009 | 0.008 |
| I | 0.04 | 0.55 | 1.45 | 0.017 | 0.0003 | 0.33 | 0.09 | 10.8 | 17.3 | 2.1 | 0.06 | 0.011 | 0.003 |
| J | 0.10 | 0.52 | 1.65 | 0.034 | 0.0027 | 0.28 | 0.34 | 11.8 | 15.4 | 1.9 | 0.05 | 0.007 | 0.007 |
| K | 0.09 | 0.48 | 1.75 | 0.034 | 0.0023 | 0.24 | 0.30 | 11.2 | 15.2 | 1.4 | 0.03 | 0.006 | 0.006 |
| L | 0.10 | 0.45 | 1.70 | 0.033 | 0.0003 | 0.32 | 0.36 | 11.8 | 15.0 | 1.5 | 0.04 | 0.011 | 0.002 |
| M | 0.08 | 0.65 | 2.33 | 0.032 | 0.0025 | — | — | 11.5 | 15.2 | 1.5 | 0.05 | 0.007 | 0.006 |
| N | 0.09 | 0.62 | 2.20 | 0.034 | 0.0022 | — | 0.18 | 11.6 | 15.0 | 1.8 | 0.05 | 0.008 | 0.004 |
| O | 0.09 | 0.67 | 2.35 | 0.030 | 0.0024 | 0.20 | — | 11.6 | 15.2 | 1.6 | 0.04 | 0.008 | 0.002 |

| Steel | Chemical Composition (mass %; balance: Fe and impurities) Other | Formula (i)† middle value | Formula (ii)† middle value |
|---|---|---|---|
| A | — | 18.0 | 16.5 |
| B | — | 19.0 | 17.0 |
| C | — | 17.5 | 11.2 |
| D | W: 027, Nb: 0.06, Cu: 0.002 | 18.2 | 12.3 |
| E | Sa: 0.001, B: 0.0030, REM: 0.05 | 19.0 | 16.8 |
| F | Bi: 0.004, Sb: 0.001, As: 0.001, Ti: 0.05, V: 0.08, Mg: 0.001 | 19.2 | 15.5 |
| G | — | 18.5 | 15.5 |
| H | — | 17.9 | <u>10.8</u> |
| I | Bi: 0.004, Cu: 0.002 | <u>20.2</u> | 14.7 |
| J | B: 0.0042, Nb: 0.02 | 18.1 | <u>17.3</u> |
| K | Cu: 0.002 | <u>17.3</u> | 15.9 |
| L | — | <u>17.2</u> | <u>17.2</u> |
| M | B: 0.0048 | 17.7 | 16.6 |
| N | Sn: 0.008, Bi: 0.001 | 17.7 | 17.0 |
| O | B: 0.0045, Sn: 0.006, Sb: 0.001 | 17.8 | 16.8 |

†$17.5 \leq Cr + Mo + 1.5 \times Si \leq 19.5 \ldots$ (i)
†$11.0 \leq Ni + 30 \times (C + N) + 0.5 \times (Mn + Cu + Co) \leq 17.0 \ldots$ (ii)

<Weldability in Fabrication>

Figure 1:
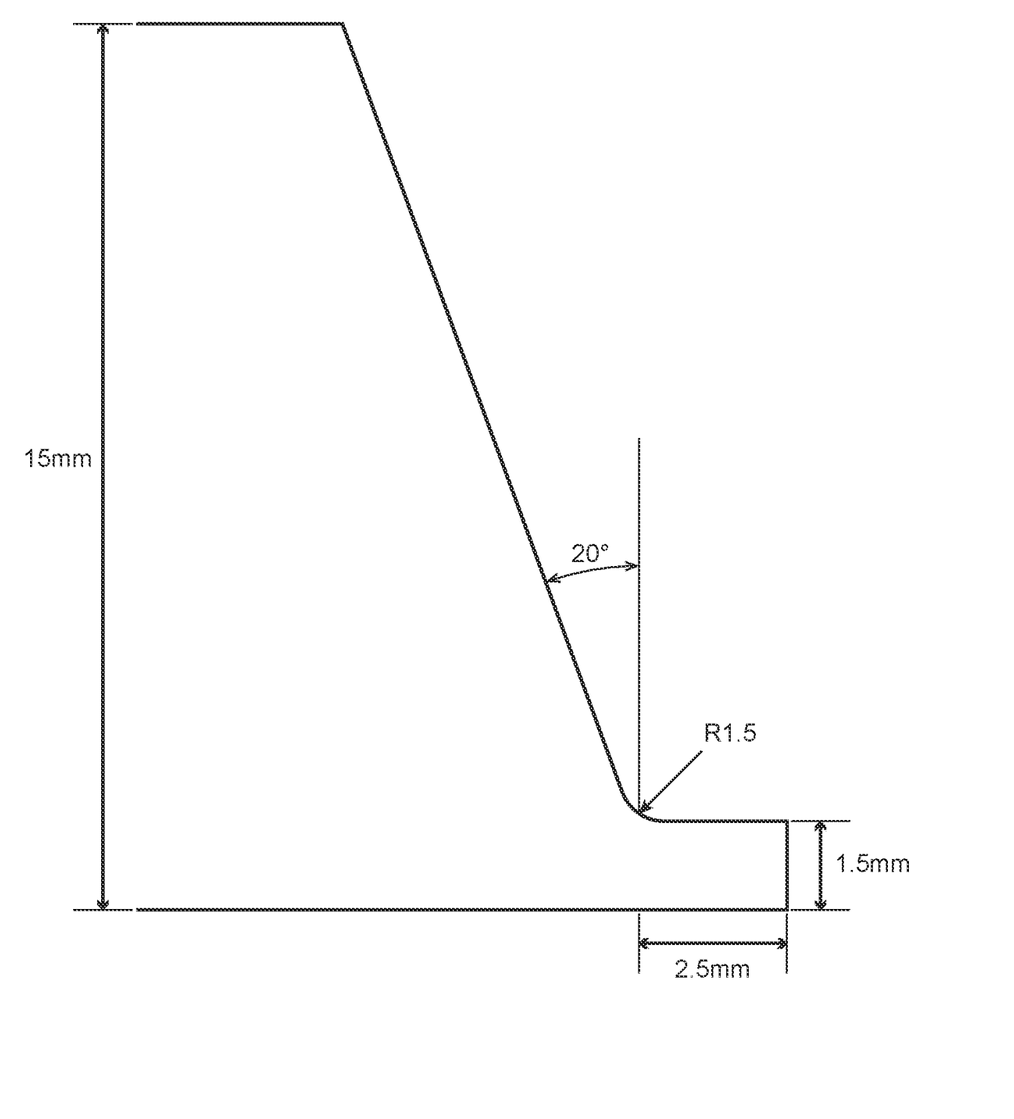
FIG. 1 is a schematic cross-sectional view illustrating the shape of a plate which was subjected to beveling in the Examples.

A bevel having the shape shown in FIG. 1 was prepared at an end part in the longitudinal direction of the aforementioned base metal. Thereafter, two of the base metals with the bevel were butted together and butt welding was performed by TIG welding without using a filler material. Two welded joints were prepared for each base metal, respectively, with a heat input of 8 kJ/cm. Among the obtained welded joints, those in which a root bead was formed across the entire length of the weld line in both welded joints were determined as having good weldability in fabrication, and were determined as "pass". Among these, welded joints in which the root bead width was 2 mm or more across the entire length were determined as being "good", and welded joints in which there was a portion in which the root bead width was less than 2 mm at even one part were determined as being "acceptable". Further, in a case where there was a portion in which a root bead was not formed at even one part among the two welded joints were determined as "fail".

<Weld Crack Resistance>

Thereafter, the periphery of the aforementioned welded joint which had undergone only root pass welding was subjected to restraint-welding onto a commercially available steel plate. Note that, the commercially available steel plate was a steel plate defined in JIS G 3160 (2008) of SM400B steel grade which had a thickness of 30 mm, a width of 150 mm and a length of 200 mm. Further, the restraint-welding was performed using a covered electrode ENi6625 defined in JIS Z 3224 (2010).

Thereafter, multi-pass welding was performed by TIG welding in the bevel. A cut filler obtained from the same plate as each base metal was used as the filler material to perform the multi-pass welding. The heat input was set in the range of 9 to 15 kJ/cm, and two welded joints were prepared for each of the base metals. Specimens for microstructural investigation were taken from five locations in one of the welded joints prepared from each base metal. A transverse section of each of the obtained specimens was mirror-polished and then etched before being observed by optical microscopy to determine whether cracks were present in the weld metal. A welded joint for which no cracks were observed in all of the five specimens was determined as "pass", and a welded joint in which cracks were observed was determined as "fail". Note that, since the root pass weld metal is the base metal as it is in a melted state, and the base metal and the cut filler have the same composition, the chemical composition in Table 1 is the same chemical composition as that of the weld metal.

<Creep Rupture Strength>

In addition, a round-bar creep rupture test specimen was taken from the remaining one welded joint of the welded joints evaluated as "pass" in the weld crack resistance in a manner so that the weld metal was at the center of the parallel portion, and a creep rupture test was performed under conditions of 650° C. and 167 MPa in which the target rupture time of the base metal was approximately 1,000 hours. A welded joint for which the rupture time was 90% or more of the target rupture time of the base metal was determined as "pass".

A summary of the results of these tests is shown in Table 2.

TABLE 2

| Test No. | Steel | Weldability in Fabrication | Weld Crack Resistance | Creep Rupture Strength |
|---|---|---|---|---|
| 1 | A | Pass (Good) | Pass | Pass |
| 2 | B | Pass (Good) | Pass | Pass |
| 3 | C | Pass (Good) | Pass | Pass |
| 4 | D | Pass (Acceptable) | Pass | Pass |
| 5 | E | Pass (Good) | Pass | Pass |
| 6 | F | Pass (Good) | Pass | Pass |
| 7 | G | Pass (Good) | Fail | Not performed |
| 8 | H | Pass (Good) | Pass | Fail |
| 9 | I | Pass (Acceptable) | Pass | Fail |
| 10 | J | Pass (Good) | Fail | Not performed |
| 11 | K | Pass (Good) | Fail | Not performed |
| 12 | L | Pass (Acceptable) | Fail | Not performed |
| 13 | M | Pass (Good) | Fail | Not performed |
| 14 | N | Pass (Good) | Fail | Not performed |
| 15 | O | Pass (Good) | Fail | Not performed |

As will be understood from Table 2, the results showed that in Test Nos. 1 to 6 in which steels A to F that satisfied the requirements defined by the present invention were used for both the base metal and filler material, the test specimens had the required weldability in fabrication and weld crack resistance during production of the welded joints and were also excellent in creep strength. Further, as will be understood by comparing Test No. 4 with Test Nos. 5 and 6, in a case where S was reduced, an improvement in the weldability by containing one or more types of element selected from Sn, S, As and Bi was recognized.

In contrast, with respect to steel G as a Comparative Example, because the content of S was outside the range defined by the present invention, in Test No. 7 which used the steel G, cracking that was determined as being ductility-dip cracking occurred in the vicinity of fusion boundaries of multi-layer welds of the weld metal. Further, because steel H was below the lower limit of formula (ii), and steel I exceeded the upper limit of formula (i), the stability of the austenite phase was insufficient. As a result, in Test Nos. 8 and 9 which used steel H and steel I, respectively, in the creep test at high temperature, a σ phase was formed and the required creep strength was not obtained.

Further, steel J was more than the upper limit of formula (ii), steel K was below the lower limit of formula (i), and steel L was below the lower limit of formula (i) and also more than the upper limit of formula (ii). Therefore, in Test Nos. 10 to 12 which used the steels J to L, respectively, the stability of the austenite phase increased excessively, and solidification segregation of S and P during solidification of the weld metal was promoted, and cracking that was determined as being solidification cracking occurred in the weld metal.

In addition, because steels M, N and O did not contain one of, or both of, Cu and Co, in Test Nos. 13 to 15 which used the steels M, N and O, respectively, an effect of reducing grain-boundary segregation of P and S was not obtained, and cracking that was determined as being solidification cracking occurred in the weld metal.

Example 2

Plates (base metals) having a thickness of 15 mm, a width of 50 mm, and a length of 100 mm were prepared from ingots that were cast by melting steels having the chemical compositions shown in Table 3, by performing hot forging, hot rolling, heat treatment and machining. Various performance evaluation tests that are described below were conducted using these plates.

TABLE 3

| | Chemical Composition (mass %; balance: Fe and impurities) | | | | | | | | | | | | |
|---|---|---|---|---|---|---|---|---|---|---|---|---|---|
| Steel | C | Si | Mn | P | S | Cu | Co | Ni | Cr | Mo | N | Al | O | Other |
| P | 0.11 | 0.32 | 1.62 | 0.018 | 0.0011 | 0.05 | 0.03 | 13.7 | 17.0 | 2.3 | 0.06 | 0.008 | 0.008 | — |
| Q | 0.07 | 0.30 | 1.65 | 0.020 | 0.0010 | 0.75 | 0.05 | 12.1 | 16.6 | 2.4 | 0.05 | 0.010 | 0.008 | W: 0.15, Sn: 0.009 |
| R | 0.12 | 0.28 | 1.28 | 0.019 | 0.0013 | 0.04 | 0.12 | 13.5 | 17.2 | 1.8 | 0.05 | 0.007 | 0.006 | Ti: 0.10, REM: 0.04 |

<Weld Crack Resistance>

A bevel having the shape shown in FIG. 1 was prepared at an end part in the longitudinal direction of the aforementioned base metals. Thereafter, two of the base metals with the bevel were butted together, and the periphery of the base metals was subjected to restraint-welding onto a commercially available steel plate which had been subjected to beveling performed so as not to interfere with the root bead. Note that, the commercially available steel plate was a steel plate defined in JIS G 3160 (2008) of SM400B steel grade which had a thickness of 30 mm, a width of 150 mm and a length of 200 mm. Further, the restraint-welding was performed using a covered electrode ENi6625 defined in JIS Z 3224 (2010).

Thereafter, multi-pass welding was performed by TIG welding in the bevel. A cut filler obtained from the plates of steel A was used as the filler material to perform the multi-pass welding. The heat input was set in the range of 9 to 15 kJ/cm, and two welded joints were produced for each of the base metals. For one of the two welded joints produced from each base metal, a machined chip was taken from the weld metal and chemical analysis was performed thereon, and specimens for microstructural investigation were taken from five locations. A transverse section of each of the obtained specimens was mirror-polished and then etched before being observed by optical microscopy to determine whether cracks were present in the weld metal. A welded joint for which no cracks were observed in all of the five specimens was determined as "pass", and a welded joint in which cracks were observed was determined as "fail".

<Creep Rupture Strength>

In addition, a round-bar creep rupture test specimen was taken from the remaining one welded joint in a manner so that the weld metal was at the center of the parallel portion, and a creep rupture test was performed under conditions of 650° C. and 167 MPa in which the target rupture time of the base metal was approximately 1,000 hours. A welded joint for which the rupture time was 90% or more of the target rupture time of the base metal was determined as "pass".

A summary of the results of these tests is shown in Tables 4 and 5.

TABLE 4

| Test No. | Base Metal | Filler Material | Chemical Composition (mass %; balance: Fe and impurities) |  |  |  |  |  |  |  |  |
|---|---|---|---|---|---|---|---|---|---|---|---|
|  |  |  | C | Si | Mn | P | S | Cu | Co | Ni | Cr |
| 16 | P | A | 0.08 | 0.28 | 1.56 | 0.018 | 0.0018 | 0.03 | 0.01 | 11.8 | 16.1 |
| 17 | Q |   | 0.07 | 0.28 | 1.56 | 0.018 | 0.0018 | 0.13 | 0.02 | 11.6 | 16.1 |
| 18 | R |   | 0.08 | 0.28 | 1.51 | 0.018 | 0.0018 | 0.03 | 0.02 | 11.8 | 16.1 |

| Test No. | Chemical Composition (mass %; balance: Fe and impurities) |  |  |  |  | Formula (i)† middle value | Formula (ii)† middle value |
|---|---|---|---|---|---|---|---|
|  | Mo | N | Al | O | Other |  |  |
| 16 | 1.7 | 0.07 | 0.008 | 0.007 | — | 18.2 | 16.9 |
| 17 | 1.7 | 0.07 | 0.008 | 0.007 | W: 0.02, Sn: 0.001 | 18.2 | 16.6 |
| 18 | 1.6 | 0.07 | 0.008 | 0.007 | Ti: 0.01, REM: 0.005 | 18.2 | 16.8 |

†$17.5 \leq Cr + Mo + 1.5 \times Si \leq 19.5$ ... (i)
†$11.0 \leq Ni + 30 \times (C + N) + 0.5 \times (Mn + Cu + Co) \leq 17.0$ ... (ii)

TABLE 5

| Test No. | Base Metal | Filler Material | Weld Crack Resistance | Creep Rupture Strength |
|---|---|---|---|---|
| 16 | P | A | Pass | Pass |
| 17 | Q |   | Pass | Pass |
| 18 | R |   | Pass | Pass |

As will be understood from Tables 4 and 5, the results showed that in Test Nos. 16 to 18 in which the chemical composition of the weld metal satisfied the requirements defined by the present invention, the test specimens had the required weldability in fabrication and weld crack resistance during production of the welded joints and were also excellent in creep strength.

As described above, it was found that the required weldability in fabrication and weld crack resistance as well as excellent creep strength were obtained only in a case where the requirements of the present invention were satisfied.

INDUSTRIAL APPLICABILITY

According to the present invention, an austenitic stainless steel weld metal which is excellent in weld crack resistance and has high creep strength and which is weld metal that constitutes a structure used in equipment to be used at high temperatures, and also a welded structure that includes the austenitic stainless steel weld metal can be obtained.

The invention claimed is:

1. An austenitic stainless steel weld metal having a chemical composition consisting of, by mass %,
   C: 0.01 to 0.10%,
   Si: 0.20 to 0.70%,
   Mn: 0.8 to 2.5%,
   P: 0.035% or less,
   S: 0.0030% or less,
   Cu: 0.01 to 0.60%,
   Co: 0.01 to 1.00%,
   Ni: 8.0 to 12.0%,
   Cr: 14.5 to 17.5%,
   Mo: 1.0 to 2.2%,
   N: 0.02 to 0.10%,
   Al: 0.030% or less,
   O: 0.020% or less,
   Sn: 0 to 0.01%,
   Sb: 0 to 0.01%,
   As: 0 to 0.01%,
   Bi: 0 to 0.01%,
   V: 0 to 0.02%,
   Nb: 0 to 0.02%,
   Ti: 0 to 0.02%,
   W: 0 to 0.50%,
   B: 0 to 0.005%,
   Ca: 0 to 0.010%,
   Mg: 0 to 0.010%,
   REM: 0 to 0.10%, and
   the balance: Fe and impurities,
   and satisfying formula (i) and formula (ii) below:

$$17.5 \leq Cr+Mo+1.5 \times Si \leq 19.5 \quad (i)$$

$$11.0 \leq Ni+30 \times (C+N)+0.5 \times (Mn+Cu+Co) \leq 17.0 \quad (ii)$$

where, each symbol of an element in the above formulas represents a content (mass %) of a corresponding element contained in the austenitic stainless steel weld metal.

2. The austenitic stainless steel weld metal according to claim 1, wherein the chemical composition contains, by mass %, one or more types of elements selected from Sn, Sb, As and Bi in a total amount within a range of more than 0% to not more than 0.01%.

3. The austenitic stainless steel weld metal according to claim 1, wherein the chemical composition contains, by mass %, one or more types of elements selected from:
V: 0.01 to 0.02%,
Nb: 0.01 to 0.02%,
Ti: 0.01 to 0.02%,
W: 0.01 to 0.50%,
B: 0.0002 to 0.005%,
Ca: 0.0005 to 0.010%,
Mg: 0.0005 to 0.010%, and
REM: 0.0005 to 0.10%.

4. A welded structure having the austenitic stainless steel weld metal according to claim 1.

5. A welded structure having the austenitic stainless steel weld metal according to claim 2.

* * * * *